(12) United States Patent
Narayan et al.

(10) Patent No.: US 7,609,004 B2
(45) Date of Patent: Oct. 27, 2009

(54) ELIMINATING SILVER MIGRATION IN EL LAMPS

(75) Inventors: Sujatha Narayan, Chandler, AZ (US); Aniruddha J. Shere, Chelmsford, MA (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 11/784,077

(22) Filed: Apr. 5, 2007

(65) Prior Publication Data

US 2008/0246390 A1   Oct. 9, 2008

(51) Int. Cl.
*G09G 3/10* (2006.01)

(52) U.S. Cl. .................................. 315/169.3; 313/503

(58) Field of Classification Search ......... 313/498–512; 315/169.1, 169.3; 428/690–691, 917; 438/26–29, 438/34, 82; 257/40, 72, 98–100, 642–643, 257/759; 427/58, 64, 66, 532–535, 539; 445/24–25
See application file for complete search history.

(56) References Cited

U.S. PATENT DOCUMENTS

| | | | | | |
|---|---|---|---|---|---|
| 4,853,594 | A | * | 8/1989 | Thomas | 313/503 |
| 5,347,198 | A | * | 9/1994 | Kimball | 315/167 |
| 6,038,153 | A | * | 3/2000 | Andersson et al. | 363/97 |
| 7,141,825 | B2 | | 11/2006 | Horio et al. | 257/79 |
| 2006/0091787 | A1 | * | 5/2006 | Kabay et al. | 313/501 |

* cited by examiner

*Primary Examiner*—Peter J Macchiarolo
*Assistant Examiner*—Donald L Raleigh
(74) *Attorney, Agent, or Firm*—Cantor Colburn LLP

(57) ABSTRACT

A net negative charge is used to eliminate silver migration in an EL lamp. An electrode containing silver, either the entire electrode, a bus bar on the electrode, or a contact area on the electrode, receives a net negative charge while the EL lamp is being driven with alternating current. The net negative charge can be provided by the driver itself or by a current source, such as a battery or a charged capacitor; or by asymmetric current means in the current path of the EL lamp, including the lamp itself.

13 Claims, 1 Drawing Sheet

ELIMINATING SILVER MIGRATION IN EL LAMPS

FIELD OF THE INVENTION

This invention relates to a lighting system including a thick film electroluminescent lamp and, in particular, to an EL lamp driven without causing silver migration.

GLOSSARY

A bridge is a circuit having four arms with two pairs of arms connected in parallel between a first pair of terminals. In each pair of arms, the arms are connected in series. The junctions of the arms in each series pair are a second pair of terminals. With unidirectional current elements in the arms and alternate arms conducting simultaneously, a bridge has a DC diagonal across one pair of terminals and an AC diagonal across the second pair of terminals.

"Asymmetric conducting means" is any electrical device or circuit that conducts approximately the same current in both directions but conducts more current in one direction than in the opposite direction.

"Thick film" refers to one type of EL lamp and "thin film" refers to another type of EL lamp. The terms only broadly relate to actual thickness and actually identify distinct disciplines. In general, thin film EL lamps are made by vacuum deposition of the various layers, usually on a glass substrate or on a preceding layer. Thick film EL lamps are generally made by depositing layers of inks on a substrate, e.g. by roll coating, spraying, or various printing techniques. The techniques for depositing ink are not exclusive, although the several lamp layers are typically deposited in the same manner, e.g. by screen printing. A thin, thick film EL lamp is not a contradiction in terms and such a lamp is considerably thicker than a thin film EL lamp.

An EL "panel" is a single sheet including one or more luminous areas, wherein each luminous area is an EL "lamp." An EL lamp is essentially a capacitor having a dielectric layer between two conductive electrodes, one of which is transparent. The dielectric layer can include phosphor particles or there can be a separate layer of phosphor particles adjacent the dielectric layer. The phosphor particles radiate light in the presence of a strong electric field, using relatively little current.

BACKGROUND OF THE INVENTION

Current, flexible, thick film EL lamps are typically formed on a release layer, such described in U.S. Pat. N0. 5,856,030 (Burrows). A first insulating layer overlies the release layer and is covered by a first electrode. A phosphor layer overlies the first electrode and a dielectric layer overlies the phosphor layer. A second electrode is deposited over the dielectric layer. A second insulator overlies the second electrode. The electrodes are a conductive polymer, such as PEDOT/PSS (Poly-3,4-ethylenedioxythiophene/ polystyrenesulfonic acid) sold under the tradename "Orgacon™" by Agfa-Gevaert N.V. The conductive polymer can be translucent or opaque, depending upon composition or additives.

Bus bars, located at least along one edge of the lit area, are used to improve the conductivity of the electrodes. Typically, the bus bars are screen printed from an ink containing resin and conductive particles, such as carbon or silver. Silver particles are desirable because they provide good conductivity and reflect light.

Silver particles contribute to a problem known as "silver migration", a dendritic growth of silver oxide crystals into the lit area of the lamp, causing black spots and electrical short circuits. The problem has long been known in the art and has been associated with DC bias on a lamp; e.g. see U.S. Pat. No. 4,143,297 (Fischer). The Fischer patent proposes a symmetrical structure to avoid "one-sided space charge conditions", i.e., DC bias. More typically, barrier layers have been proposed to minimize silver migration. For example, see U.S. Pat. No. 5,697,322 (Hay et al.), U.S. Pat. No. 5,811,930 (Krafcik et al.), U.S. Pat. No. 6,586,873 (Mizutani et al.), and U.S. Pat. No. 6,965,196 (Murasko et al.).

In portable electronic devices, automotive displays, and other applications where the power source is a low voltage battery, an EL lamp is powered by a driver that converts low voltage direct current into high voltage alternating current. In order for an EL lamp to glow sufficiently, a peak-to-peak voltage in excess of about one hundred and twenty volts is necessary. The actual voltage depends on the construction of the lamp and, in particular, the field strength within the phosphor powder.

U.S. Pat. No. 4,210,848 (Suzuki et al.) discloses a driver having a switching bridge output. The bridge acts as a double pole double throw switch to alternate current through the EL lamp at low frequency. U.S. Pat. No. 5,313,141 (Kimball) discloses a driver that produces AC voltage without a bridge. A plurality of drivers are commercially available in integrated circuit form using either technology.

Unless components are carefully matched, and they are not because it is too expensive, there is usually a slight asymmetry in the waveform applied to an EL lamp. The slight asymmetry causes a DC bias to accumulate over time and several techniques have been proposed for preventing the accumulation of charge or for more thoroughly discharging a lamp, thereby reducing DC bias. Unless the DC bias is removed completely, or silver is not used, the problem of silver migration exists in the prior art. There are also test results suggesting that moisture and field intensity contribute to silver migration.

In view of the foregoing, it is therefore an object of the invention to provide an apparatus and a method for eliminating silver migration in EL lamps without eliminating silver.

A further object of the invention is to eliminate silver migration regardless of moisture or field intensity.

Another object of the invention is to simplify the construction of EL lamps, and reduce costs, by eliminating barrier layers for reducing silver migration.

SUMMARY OF THE INVENTION

The foregoing objects are achieved in this invention in which an electrode containing silver receives a net negative charge while the EL lamp is being driven with alternating current. The net negative charge can be provided by the driver itself or by a current source, such as a battery or a charged capacitor, or by asymmetric current means in the current path of the EL lamp, including the lamp itself.

BRIEF DESCRIPTION OF THE DRAWING

A more complete understanding of the invention can be obtained by considering the following detailed description in conjunction with the accompanying drawing, in which.

DETAILED DESCRIPTION OF THE INVENTION

Figure 1:
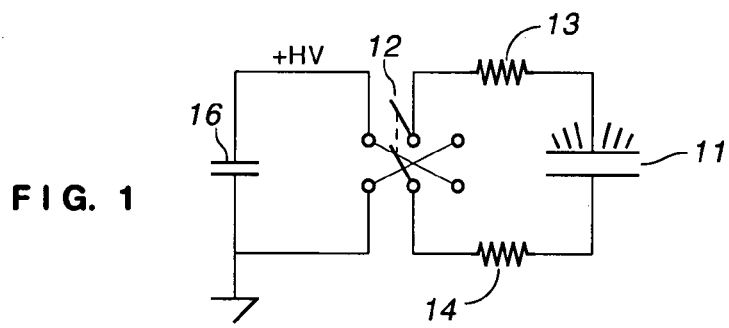
FIG. 1 illustrates the operation of a bridge circuit for converting DC to AC.

As note above, an electroluminescent lamp requires an alternating current for operation. When a direct current source is all that is available, alternately reversing the connections of an EL lamp and a source of direct current will provide an alternating current. As illustrated in FIG. 1, the terminals of EL lamp 11 are coupled to respective poles of double pole, double throw (DPDT) switch 12 through resistors 13 and 14. The throws of switch 12 are connected to capacitor 16, which stores high voltage DC from a suitable source, not shown. When switch 12 is closed to the left, voltage at a first polarity is applied to EL lamp 11. When the switch is closed to the right, the polarity of the voltage applied to EL lamp 11 is reversed, producing, over successive cycles, an alternating current through the lamp. If resistors 13 and 14 are not identical, a net charge accumulates on EL lamp 11. The net charge is a DC bias voltage on EL lamp 11.

Figure 2:
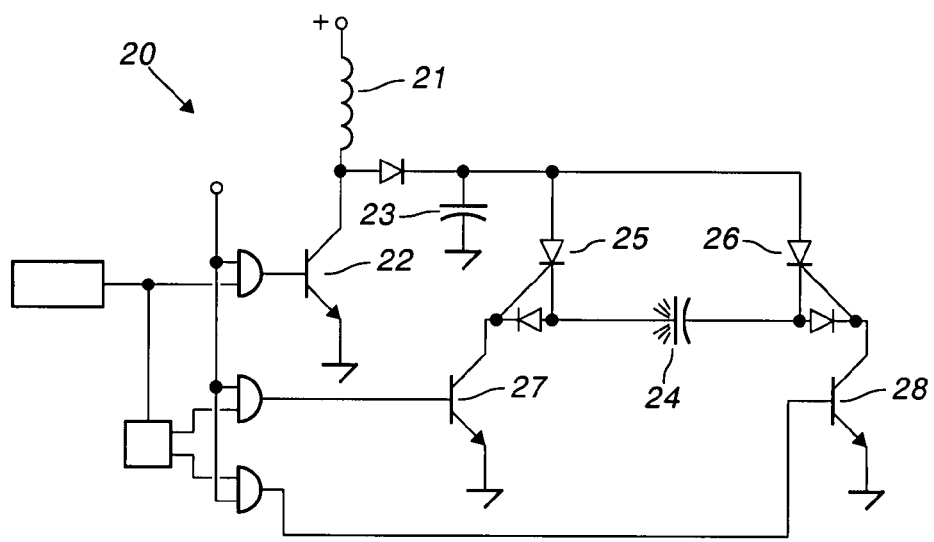
FIG. 2 is a schematic of a commercially available driver having a bridge output.

FIG. 2 is a schematic of a commercially available driver that includes the electronic analog of a DPDT switch. Driver 20 includes inductor 21 and switching transistor 22 operating in a well known boost configuration to charge capacitor 23 to a high voltage. A bridge circuit, including SCR 25, SCR 26, switching transistor 27, and switching transistor 28, converts the voltage on capacitor 23 to alternating current. EL lamp 24 is connected to the AC diagonal of the bridge. Capacitor 23 is connected across the DC diagonal of the bridge. SCR 25 and transistor 28 conduct simultaneously to pass current in a first direction through EL lamp 24. SCR 26 and transistor 27 conduct simultaneously to pass current in a second direction through EL lamp 24, alternating with SCR 25 and transistor 28. As in the case of FIG. 1, if the electrical components are not identical for each half of the bridge, a net charge accumulates on EL lamp 24.

Figure 3:
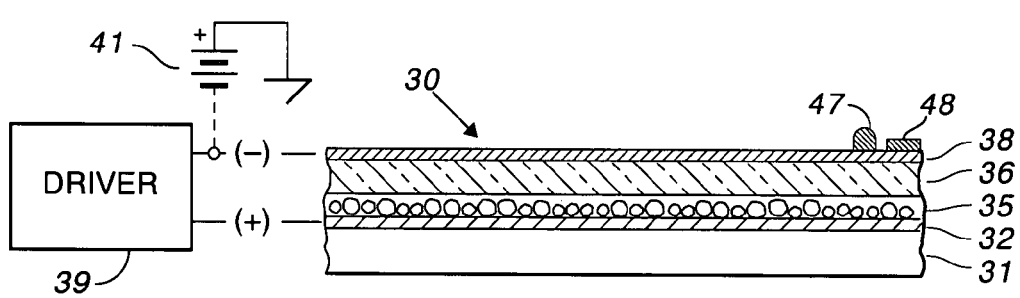
FIG. 3 is a partial cross-section of an EL lamp biased in accordance with the invention.

FIG. 3 illustrates an EL lamp in cross-section, with the layers not drawn to scale, coupled to a driver in accordance with the invention. EL lamp 30 includes transparent front electrode 32 overlying substrate 31. Front electrode 32 is a transparent conductor, such as a transparent layer of Orgacon™ polymer coupled to bus bars (not shown) containing carbon particles or other conductivity enhancing particles but not silver particles. Phosphor layer 35 overlies the front electrode and dielectric layer 36 overlies the phosphor layer. Layers 35 and 36 are combined in some applications. Overlying dielectric layer 36 is opaque rear electrode 38. An optional backing layer (not shown) may also be provided, e.g. for insulating the rear electrode or sealing the lamp. Coated phosphor particles are used, eliminating the need for a sealing layer. In accordance with one aspect of the invention, rear electrode 38 is preferably deposited from an ink containing silver particles, thereby providing the functions of reflection and conduction.

In accordance with another aspect of the invention, driver 39 is coupled to EL lamp 30 in such a way as to cause negative charge to accumulate on rear electrode 38. Specifically, rear electrode 38 is biased negatively with respect to front electrode 32. A net negative charge is all that is necessary. The negative voltage can be a fraction of a volt and still be effective.

For a given driver, the DC bias is readily determined by simply running the driver with a capacitive load and measuring the bias. The connections to the driver are noted and, for all drivers of that type, one pin is noted as the positive pin and the other pin is noted as the negative pin. It has been found that drivers of the same type, e.g. D381, behave the same way. Although the amount of DC bias may vary from device to device of a given type, the polarity of the DC bias does not. In a test of over one hundred drivers of the same type, the DC bias varied from 0.10 to 2.90 volts with an average of 1.12 volts and a standard deviation of 0.53 volts. The polarity of the bias was always the same.

In accordance with another aspect of the invention, rather than testing drivers, one can provide negative charge from an external voltage or by introducing an asymmetry in the current path of an EL lamp. In FIG. 3, optional voltage source 41 provides direct current to EL lamp 30. The direct current causes an offset in the alternating current to the lamp from driver 39, making the waveform of the current asymmetrical about zero and resulting in a net negative charge on electrode 38.

Figure 4:
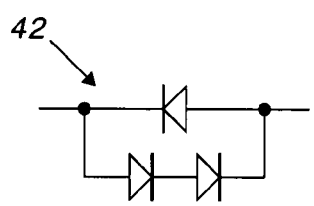
FIG. 4 is a schematic of an asymmetric current means.
Figure 5:
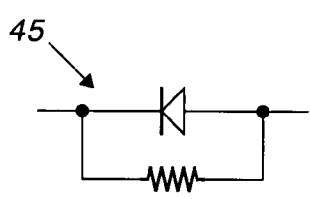
FIG. 5 is a schematic of another asymmetric current means.

Asymmetric current means (42, 45) in the current path of an EL lamp can be a diode in anti-parallel with two or more series connected diodes, as illustrated in FIG. 4, or a resistor in parallel with a diode, as illustrated in FIG. 5. Using either external bias or asymmetry provides the necessary bias for EL lamps having three or more electrodes. The use of external bias or asymmetric current means overcomes the inherent polarity, if any, in a driver because the bias is forced in a preferred direction.

The invention thus provides an apparatus and a method for eliminating silver migration in EL lamps without eliminating silver. A net negative charge eliminates silver migration in EL lamp regardless of moisture or field intensity. The invention reduces the cost of making an EL lamp by eliminating the need for barrier layers.

Having thus described the invention, it will be apparent to those of skill in the art that various modifications can be made within the scope of the invention. For example, the invention is independent of the kind of EL lamp or the type of driver. If rear electrode 38 does not contain silver, the electrode can include bus bars, such as bus bar 41, containing silver particles, or contact areas, such as contact area 42, containing silver particles. Whatever the construction, the silver particles are associated with only one electrode in a two electrode lamp. In a lamp having plural electrodes, one electrode must have a net positive charge and the other electrodes can include silver.

What is claimed as the invention is:

1. A lighting system including an EL lamp having a first electrode, a second electrode, a dielectric layer and a phosphor layer between the first electrode and the second electrode, and a driver supplying alternating current to the lamp, characterized in that the first electrode contains silver particles, the second electrode does not contain silver particles, and the driver includes a bias circuit that produces a net negative charge on the first electrode.

2. The lighting system as set forth in claim 1 wherein said bias circuit is an source of direct current.

3. The lighting system as set forth in claim 1 wherein said bias circuit is an asymmetric conducting means in series with said EL lamp.

4. The lighting system as set forth in claim 1 wherein substantially the entire first electrode includes silver particles and is reflective.

5. A lighting system including an EL lamp having a first electrode, a second electrode, a dielectric layer and a phosphor layer between the first electrode and the second electrode, and a driver supplying alternating current to the lamp, characterized in that the first electrode includes a bus bar and the bus bar contains silver particles, the second electrode does not contain silver particles, and the driver includes a bias circuit that charges the EL lamp with net negative charge on the first electrode.

6. The lighting system as set forth in claim 5 wherein said bias circuit includes a source of direct current.

7. The lighting system as set forth in claim 5 wherein said bias circuit includes asymmetric conducting means in series with said EL lamp.

8. A lighting system including an EL lamp having a first electrode, a second electrode, a dielectric layer and a phosphor layer between the first electrode and the second electrode, and a driver supplying alternating current to the lamp, characterized in that the first electrode includes a contact area and the contact area contains silver particles, the second electrode does not contain silver particles, and the driver includes a bias circuit that charges the EL lamp with net negative charge on the first electrode.

9. The lighting system as set forth in claim 8 wherein said bias circuit includes a source of direct current.

10. The lighting system as set forth in claim 8 wherein said bias circuit includes asymmetric conducting means in series with said EL lamp.

11. A method for eliminating silver migration in an EL lamp having an electrode containing silver particles, said method comprising the steps of:
   supplying alternating current to the EL lamp during operation; and providing a DC offset to the alternating current, thereby generating a net negative charge on the electrode.

12. The method as set forth in claim 11 wherein said providing step includes the step of:
   coupling an asymmetric current means in series with the EL lamp.

13. The method as set forth in claim 11 wherein said providing step includes the step of:
   adding direct current to the alternating current.

* * * * *